Jan. 15, 1929.

H. B. KIPPER 1,699,362

ALKALI METAL CYANIDE PROCESS AND APPARATUS

Filed May 7, 1926      2 Sheets-Sheet 1

Inventor
Herman B. Kipper
By Frank E. Liwrance, Jr.
Attorney.

Jan. 15, 1929.
H. B. KIPPER
1,699,362
ALKALI METAL CYANIDE PROCESS AND APPARATUS
Filed May 7, 1926   2 Sheets-Sheet 2
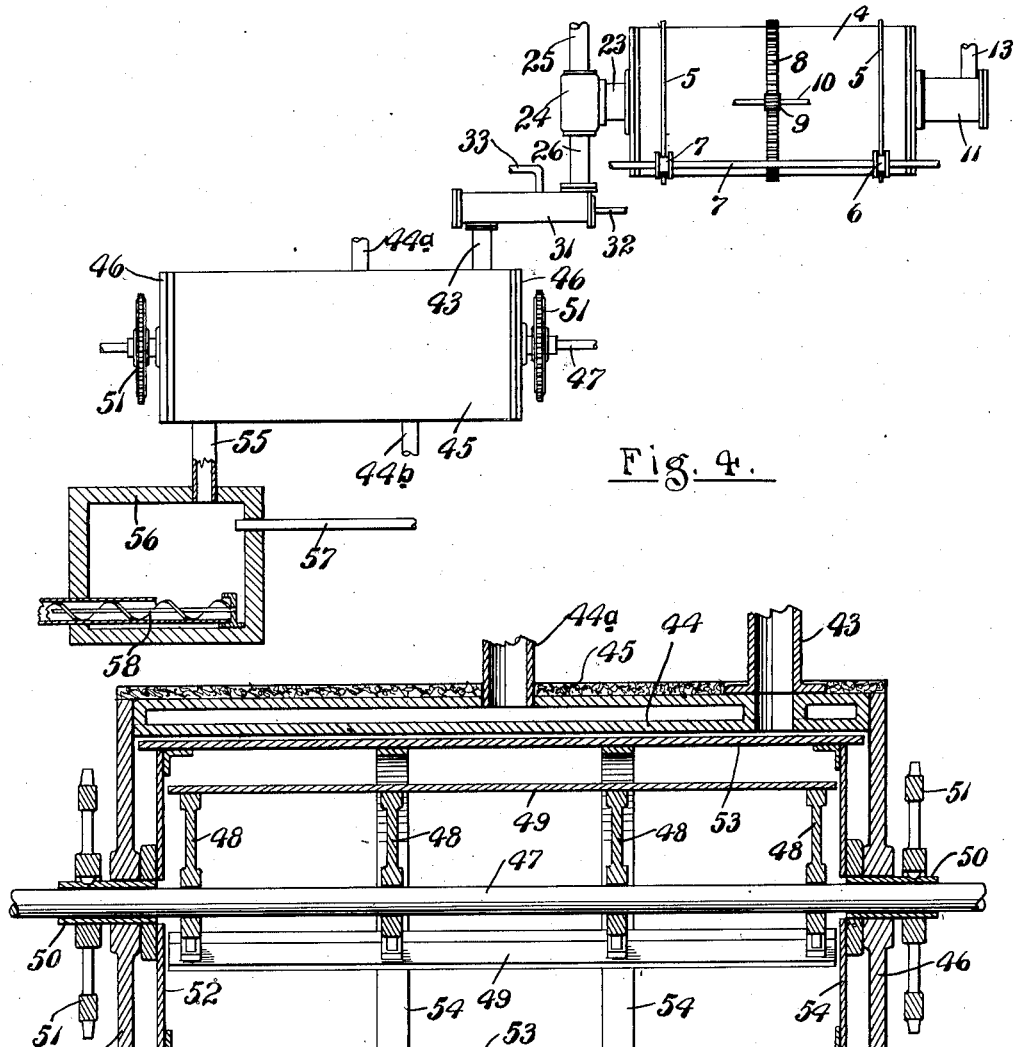
Inventor
Herman B. Kipper
By Frank E. Liverance Jr.
Attorney.

Patented Jan. 15, 1929.

1,699,362

UNITED STATES PATENT OFFICE.

HERMAN B. KIPPER, OF MUSKEGON, MICHIGAN.

ALKALI METAL CYANIDE PROCESS AND APPARATUS.

Application filed May 7, 1926. Serial No. 107,459.

This invention relates to a process and combination of apparatus for producing alkali metal cyanides by the action of gas containing nitrogen heated to a high temperature or of from 1000 to 1500 degrees C. or air heated to a high degree of temperature, or from 500 to 1000 degrees C., or a mixture thereof, on alkali metallic salts, such as sodium and potassium in the presence of a finely divided catalyst. If highly heated air is used, finely divided carbon is mixed with the alkali metal salts and the metal catalyst in excess of that required for the actual chemical reaction to produce the necessary heat required for the reaction of the nitrogen on the salts to produce alkali metal cyanides. By reason of the fact that the reactions occurring absorb a large amount of heat, it is necessary that in addition to the heat produced by burning carbon to carbon monoxide there shall be other heat produced externally to the reaction chamber, in which the various reactions take place. This is accomplished by heating the air before it is introduced into the chamber to a high degree of temperature, advantageously to from 500 to 1000 degrees C. If producer gas is used, this is heated to above 1000 degrees C.

In the present invention the production of alkali metal cyanides follows from the action of carbon and an alkali metal salt mixed with the finely divided iron, or iron and manganese, for a catalyst. These materials are continuously fed into the reaction chamber and treated with air heated to a high temperature or producer gas likewise so heated or a mixture thereof. The reactions take place and the products are delivered at the other end of the chamber, said products including alkali metal cyanide in more or less complete form, nitrogen and carbon monoxide, the latter of which is utilized as a fuel to supply heat for heating the air which is used in the reaction chamber.

With the completion of the first portion of the reactions the solid matter which contains more or less alkali metal cyanide is led to a second reaction chamber externally heated which is supplied with nitrogen so as to complete the reactions which may not have been finished as to all of the material in the first chamber. The present invention relates to the apparatus and the process outlined understanding of which will be had from the following description taken in connection with the accompanying drawings, in which, Fig. 1 is a plan view of the installation for effecting the first period of the alkali metal cyanide production process.

Fig. 4 is a reduced side elevation with parts in section showing the complete apparatus for producing the alkali metal cyanides.

Fig. 5 is a longitudinal vertical section through the exteriorly heated second reaction chamber used, and Fig. 6 is a transverse vertical section through the drum shown in Fig. 5.

Like reference characters refer to like parts in the several views of the drawings.

Figure 1:
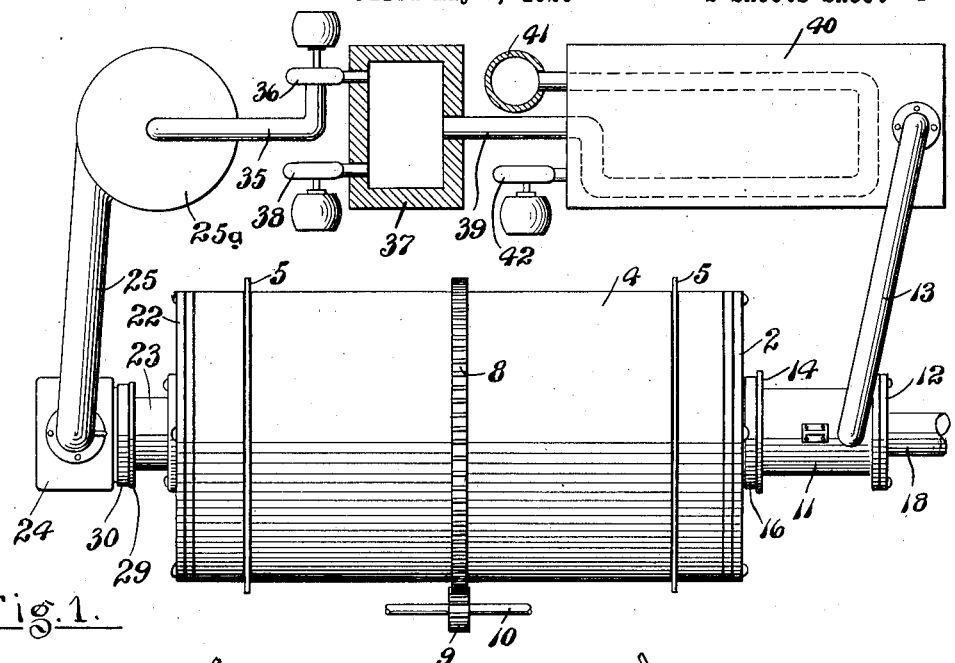
Figure 2:
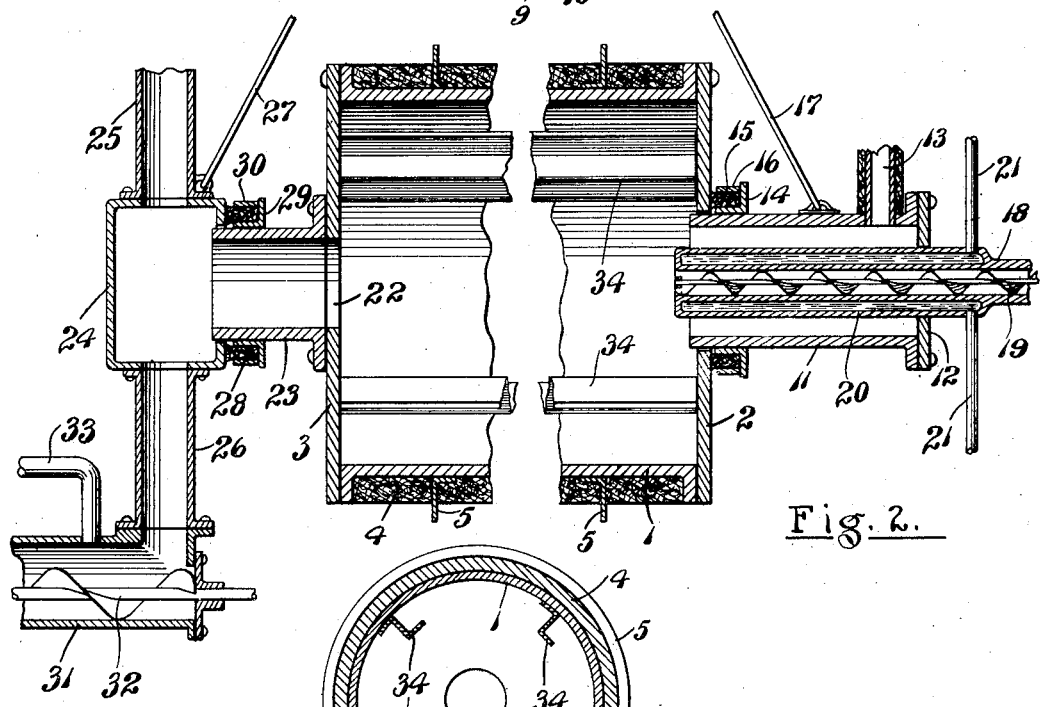
Fig. 2 is a somewhat enlarged longitudinal vertical section through the reaction chamber or drum, its inlet and outlet.
Figure 3:
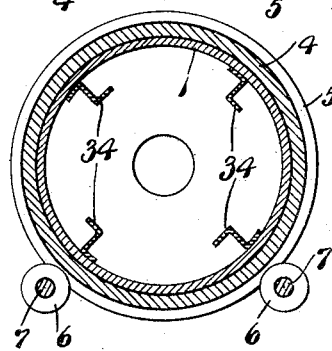
Fig. 3 is a transverse vertical section through said drum.

The apparatus shown in Figs. 1, 2 and 3 comprises a cylindrical drum 1 of suitable material having ends 2 and 3 secured thereto and being covered with asbestos or other heat insulating material 4, as shown. Annular rings 5 of metal are attached to the outer side of the drum 1 and bear upon rollers 6 mounted on horizontal shafts 7 located near the lower side of the drum so that said drum may be rotated about its longitudinal axis. The drum may be rotated in any desired manner but as shown an annular gear ring 8 is connected to the drum and may be driven from a pinion 9 on a shaft 10, the shaft being driven from a source of power. It is evident that the drum will rotate at relatively low speed.

At one end of the drum, that indicated at 2, an opening is made into which one end of a cylindrical sleeve 11 extends, the outer end being closed by a plate 12. A pipe 13 leads into the sleeve, this pipe being designed to carry highly heated air which is delivered into the drum. A flanged ring 14 is connected to the sleeve 11 a short distance from the end 2 and between the flanges of said ring and said end asbestos packing 15 is disposed and held from outward movement by a surrounding metal ring 16. The sleeve 11 normally presses inwardly by gravity thereby causing the flanged ring 14 to bear against and compress the packing 15 against the end 2 of the drum, making an air and gas tight fitting, as is evident. This follows as a result of the suspension of the sleeve 11 from a rod 17 which extends upwardly and inwardly over the drum 1 having any suitable connection at its upper end to a stationary support whereby the heavy sleeve 11 tending to move to a position directly below said support presses inwardly so as to force the packing 15 against the end 2 of the drum.

The reaction material consisting of an alkali metal salt such as sodium or potassium carbonate or other sodium, potassium or other alkali metal salt, coke and iron finely divided and mixed together, is introduced into the reaction drum through a pipe 18, being fed thereinto by the screw conveyer 19 extending through the pipe. This pipe 18 extends through the plate 12 and lengthwise of the sleeve 11 being water jacketed where it passes through said sleeve and to a short distance beyond the plate 12 as indicated at 20, the water flowing into and out of the surrounding jacket through the pipes 21. The reaction material is fed continuously in the proper amount into the reaction drum 1, screw conveyer 19 being continuously driven.

An opening 22 is made centrally of the opposite end plate 3 and an outlet sleeve 23 is connected to the end 3 at said opening. The material passing from the reaction chamber or drum passes into a housing 24 which has an upper vertical outlet 25 and a downwardly extending vertical outlet 26 at its opposite upper and lower sides. This housing 24 with the outlet pipes 25 and 26 and parts attached thereto is suspended by the rod 27 in the same manner that the sleeve 11 is suspended by the rod 17, there being a tendency for the housing to swing inwardly toward the end 3 of the drum. Asbestos packing 28 is disposed between the inner side of the housing 24 and the flanged ring 29 secured to the sleeve 23 there being a metal band or ring 30 around the packing. It is evident that with this construction a gas tight joint is provided between the housing 24 and the sleeve 23. The solid material which passes through the sleeve 23 to the housing 24 drops through the vertical pipes 26 to a horizontal pipe 31 connected therewith in which a screw conveyer 32 moves the same along to the second reaction chamber which will be later described. Nitrogen gas is continuously fed into the pipe 31 through the pipe 33 in order that no decomposition of the high temperature cyanide compound will take place as would take place in the presence of oxygen and in order to further complete the reactions for the production of alkali cyanide in the second step of the process in the second reaction chamber.

The gases given off by the reactions pass upwardly through the pipe 25 and thence to a scrubber 25ª where any minute solid particles or dust is removed. Leaving the scrubber the gas which consists chiefly of carbon monoxide passes through the pipe 35 to a blower 36 hence it is forced into a chamber 37 and mixed with air forced therein by a blower 38. The combined mixture of carbon monoxide and air leaves through the pipe 39 which is the inlet to a recuperator indicated at 40 wherein the mixture is burned producing a large quantity of heat. The products of combustion pass outwardly through the stack 41. Air is forced into the recuperator by blower at 42, is heated to a high degree of temperature and above 700 degrees centigrade and is forced therefrom outwardly into the pipe 13 into the sleeve 11 and thence to the drum 2.

The drum rotating continuously brings the reaction material therein very intimately into relation with the highly heated air which is forced into the drum. The reaction material being in finely divided state is continuously being elevated and dropped from the upper to the lower sides of the drum, suitable Z bars 34 being connected lengthwise of and on the inner side of the drum and acting, as is evident, to lift the material and drop it substantially from the upper side of the drum downward across the highly heated air which is forced through and lengthwise of said drum. The carbon is consumed and the nitrogen of the air, the alkali metal element in the alkali metal salt and carbon combine to produce alkali metal cyanide or alkali metal cyanamide. There is also produced carbon monoxide which is utilized for the purpose of heating the air coming to the reaction drum as has been described.

The products of the reaction delivered to the pipe 31 and moved along the same by the conveyer 32 are emptied through a pipe 43 into a second cylinder 44 which is adapted to be exteriorly heated. In the construction shown the cylindrical wall 36 is jacketed and in the space highly heated gases may be circulated entering through the pipe 44ª and leaving through the pipe 44ᵇ. This method of exterior heat for the drum may be varied in any desired manner as long as exterior heat therefor is provided. The cylinder is covered with asbestos or other heat insulating material 45 so as to conserve the heat. Each end of the cylinder is closed by a plate 46 to make an enclosed drum.

A shaft 47 is disposed lengthwise of the cylinder and may be rotated at relatively high speed, on which are a plurality of spaced apart spiders having radial arms 48, beating bars 49 being connected horizontally to and at the outer ends of the various arms 48, as shown.

The shaft 47 extends through the sleeve 50 passing through the ends 46 of the drum and said sleeves are equipped with sprocket wheels 51 so that the sleeves may be rotated at much slower speed than the rotation of the shaft 39. The sleeves 50 at their inner ends are equipped with discs 52 between which discs scraping bars 53 are disposed, having beveled edges which are closely adjacent to the inner walls of the outer shell 44. Reinforcing rings 54 disposed at spaced apart points between the discs 52 serving to reinforce and hold rigid said scraping bars.

The products of the reactions within the drum are delivered through an outlet pipe 55 to an enclosed chamber 56 from which gases are withdrawn through a pipe 57, the cyanide products, after the same have cooled, being removed from said chamber by the screw conveyer 58, as fully shown in Fig. 4.

The reactive materials which have been introduced into the first reaction chamber or drum as they reach the level of the outlet opening 22 are delivered as has been described to the second reaction chamber or drum to which heat is supplied exteriorly. At the same time nitrogen is fed into the drum through the pipe 33 and the reactions not completed in the first chamber are completed and any reaction materials which have not been properly reduced are reduced to cyanide and delivered to the chamber 56. The construction of the second reaction chamber or drum may be widely varied. While I have shown a stationary drum with rotating beating and pulverizing bars and movable scraper bars it is evident that the drum may be made rotatable, the scraper bars remaining fixed and the same type of bars as shown at 34 in Fig. 2 used to lift the material and drop it across the reaction chamber in order to bring the materials intimately into engagement with the nitrogen gas. There may be many modifications in the constructive detail of the apparatus and there may be some equivalent variations in the manner of carrying out this process. For instance, while the pipe 13 has been described as carrying highly heated air one of the constituents of which is nitrogen gas it is contemplated that producer gas which contains carbon monoxide and nitrogen may be highly heated and passed through said pipe to the container. Also the pipe 33 which has been described as carrying nitrogen may be utilized to carry either nitrogen alone or a mixture of nitrogen and carbon monoxide such as is present in producer gas.

The reaction materials may be advantageously first heated and acted upon together with the catalyst in a form of producer recently covered by me in a patent application, the principle of which is very similar to a gas producer, with the bottom closed and from which the sodium carbonate together with the cyanide tends to flow off at the bottom. In case this form of apparatus is used for first heating, the sodium carbonate, mixed with the catalyst and excess coke, may also be withdrawn at a high temperature, for instance 500 to 1000 degrees C., by a helical worm or otherwise, from the bottom of the apparatus.

The separate treatment of the raw materials before conversion to cyanide may also be carried out by my method of processing. For instance, the sodium carbonate may be fused in a pot or pan and the carbon or coke preheated within a rotary cylinder, with partial combustion of the same, before mixing and converting in my high speed or other converter.

A very good catalyst which I have used is finely ground manganese ore and this in many instances is preferable to iron or iron ore. It is also apparent that the raw materials which are fed into the cylinder 1 by the screw conveyor 19 may be preheated before introduced into the cylinder so that the same may be partially fused and at least carry a large quantity of heat to aid in the reactions. Accordingly, I do not limit my invention to the specific construction shown and the exact and specific steps of the process described but consider myself entitled to all equivalent forms or modifications of the apparatus and all variations in the process which come within the scope of the appended claims defining this invention.

In my process so far described, I have treated upon the formation of sodium cyanide. Ammonia may be readily secured from this and I have found my apparatus especially advantageous for the purpose. In order to produce ammonia, the cyanide is fed through my apparatus with rapidly moving beater bars and slow moving scraping mechanism externally heated to a temperature of from 300 to 500 degrees C. and treated with steam during its passage through the same. The steam is fed in a counter current direction to the flow of the raw materials, in this case the mixture of sodium cyanide, some unconverted sodium carbonate, metal catalyst and coke. The ammonia formed is drawn off with the other materials, or may be drawn off from the top of the apparatus by a separate exist or opening. The ammonia is then washed and recovered by any of the usual methods.

In order to hold the material somewhat longer in the apparatus during its conversion, a ring or dam may be inserted on the slow moving bars just before the exit of the finished product. The latter tends to hold back the reaction materials, so that they are subjected to the beating action of the rapidly moving metal parts and the conversion efficiency of the apparatus is thereby increased, although somewhat greater power is required.

I claim:

1. The production of alkali metal cyanides by the action of a gaseous mixture containing nitrogen heated to a high temperature on a mixture of sodium carbonate, carbon and a manganese iron ore within an insulated receptable, followed by the further action on the products produced of a gas containing nitrogen within a second externally heated receptacle.

2. The process of producing alkali metal cyanides which consists in continuously feeding a mixture of an alkali carbonate, carbon and an iron catalyst into an enclosed receptacle rotatably mounted and provided with lifting and dumping means to carry the mixture to its upper portion and to drop the same to its lower portion, and subjecting the said mixture to the action of a highly heated gas forced through the mixture, said gas containing nitrogen, substantially as described.

3. The herein described process of producing alkali metal cyanides which consists in feeding reactive material comprising an alkali salt, carbon and a catalyst into one end of a rotating cylinder, the opposite end of the cylinder having an outlet for the products of the reaction, continuously rotating said cylinder and lifting the materials therein to an upper position and dropping them across the cylinder, forcing a highly heated gas containing nitrogen longitudinally through the cylinder, carrying the solid products of the reaction to a second receptacle externally heated, and subjecting said products of the reaction to the action of a gas containing nitrogen, substantially as described.

4. The herein described process of producing alkali metal cyanides which consists in feeding reactive material comprising an akali salt, carbon and a manganese-iron catalyst into one end of a rotating cylinder the opposite end of the cylinder having an outlet for the products of the reaction, continuously rotating said cylinder and lifting the materials therein to an upper position and dropping them across the cylinder, forcing a highly heated gas containing nitrogen longitudinally through the cylinder, carrying the solid products of the reaction to a second receptacle externally heated, breaking up and pulverizing said products of reaction continuously in the second receptacle and subjecting the same to the action of a reacting gas which contains nitrogen.

5. The herein described process which consists of subjecting an alkali carbonate, carbon and a catalyst containing iron to the action of highly heated gases within a container, followed by transferring the solid products obtained in the first container to a second container and the subjecting of said products to the further action of a reacting gas.

6. The action of a highly heated gas containing nitrogen on a mixture of alkali metal salts, coke and a catalyst in an insulated vessel and the treatment of the highly heated mass with nitrogen in a second vessel externally heated.

7. The separate heating and reaction of alkali metal salts, coke and catalyst, and the conversion of the products thereof to alkali metal cyanides, with nitrogen, in a heated vessel.

8. The separate heating and reaction of sodium carbonate, coke and a catalyst containing iron, and the conversion of products thereof to sodium cyanide with nitrogen in a heated vessel.

9. The separate heating and reaction of sodium carbonate, coke and a catalyst containing iron, and the conversion of the products thereof to sodium cyanide with nitrogen in an insulated cylinder with high speed beating mechanism and slow speed scraping mechanism.

10. The herein described process of producing alkali metal cyanides which consists in feeding reaction materials comprising alkali metal salts, carbon and a metal catalyst in finely divided form into one end of the reaction chamber, rapidly beating and maintaining said materials in finely divided form and simultaneously slowly scraping said materials from the walls of the cylinder and forcing nitrogen gas into said cylinder and externally heating said cylinder to above 600° C.

11. The herein described process of producing alkali metal cyanide which consists in heating reaction materials comprising alkali metal salt, carbon and iron-manganese catalyst, feeding the same into one end of a reaction cylinder, rapidly beating and pulverizing said materials to maintain them in finely divided form, scraping the materials slowly from the walls of the cylinder, maintaining said cylinder temperature to above 600° C. and forcing preheated nitrogen gas through said cylinder.

12. The herein described process of producing alkali metal cyanide materials for use in ammonia production, which consists in feeding preheated reaction materials comprising alkali salts, carbon and iron-manganese catalyst into one end of a reaction cylinder, mechanically acting on said materials rapidly to maintain the same in finely divided form, slowly scraping said materials from the inner walls of the cylinder, feeding nitrogen gas into the cylinder so as to pass through the materials in a direction different than the movement of said materials through the cylinder and maintaining the temperature of the cylinder above 600 degrees centrigrade.

In testimony whereof I affix my signature.

HERMAN B. KIPPER.